United States Patent
McLoughlin et al.

(10) Patent No.: US 10,663,686 B2
(45) Date of Patent: May 26, 2020

(54) CABLE MANAGEMENT DEVICE AND METHOD

(71) Applicant: Siemens Aktiengesellschaft, Munich (DE)

(72) Inventors: Michael McLoughlin, Ulverston (GB); Jens Holt Spanggaard, Skollenborg (NO); Kelly Turner, Dalton-in-Furness (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/069,210

(22) PCT Filed: Oct. 28, 2016

(86) PCT No.: PCT/EP2016/076021
§ 371 (c)(1),
(2) Date: Jul. 11, 2018

(87) PCT Pub. No.: WO2017/121510
PCT Pub. Date: Jul. 20, 2017

(65) Prior Publication Data
US 2019/0004270 A1  Jan. 3, 2019

(30) Foreign Application Priority Data
Jan. 13, 2016  (EP) .................................... 16151038

(51) Int. Cl.
*G02B 6/44* (2006.01)
*G02B 6/46* (2006.01)
*B65H 54/72* (2006.01)

(52) U.S. Cl.
CPC .......... *G02B 6/4458* (2013.01); *B65H 54/72* (2013.01); *G02B 6/4446* (2013.01); *G02B 6/4454* (2013.01)

(58) Field of Classification Search
CPC .................................................. G02B 6/4458
See application file for complete search history.

(56) References Cited

U.S. PATENT DOCUMENTS 4,666,240 A    5/1987  Caron et al.
5,042,901 A  * 8/1991  Merriken ............. G02B 6/3816
                                                    385/135

(Continued)

FOREIGN PATENT DOCUMENTS

JP    56130708 A  * 10/1981  ........... G02B 6/4428
JP    57148713 A  *  9/1982  ........... G02B 6/4441

(Continued)

OTHER PUBLICATIONS

International Search Report PCT/ISA/210 for International Application No. PCT/EP2016/076021 dated Feb. 1, 2017.

(Continued)

*Primary Examiner* — Michelle R Connelly
(74) *Attorney, Agent, or Firm* — Harness, Dickey & Pierce, P.L.C.

(57) ABSTRACT

A device is disclosed for managing at least one flexible cable including a rigid portion. In at least one embodiment the device includes a first axial end and a second axial end distanced from one another along an axis of the device; at least a first winding surface at the first axial end and at least a second winding surface at the second axial for receiving at least first coil and a second coil of the flexible cable, the first and second winding surfaces being transversal with respect to the axis; and a constraint in the form of a clip or a (Continued)

cylindrical surface for supporting the rigid portion of the flexible cable between the first and the second axial end.

25 Claims, 6 Drawing Sheets

(56) References Cited

U.S. PATENT DOCUMENTS

| | | |
|---|---|---|
| 6,533,472 B1 | 3/2003 | Dinh et al. |
| 8,731,362 B2 | 5/2014 | Cairns |
| 2012/0025005 A1 | 2/2012 | Smith et al. |
| 2015/0376956 A1* | 12/2015 | Richards ............... F16L 25/02 166/65.1 |

FOREIGN PATENT DOCUMENTS

| | | | | | |
|---|---|---|---|---|---|
| JP | 59031917 A | * | 2/1984 | ........... | G02B 6/4441 |
| JP | 59072412 A | * | 4/1984 | ........... | G02B 6/4441 |
| JP | 06094929 A | * | 4/1994 | ........... | G02B 6/4446 |
| WO | WO-9737263 A1 | * | 10/1997 | ........... | G02B 6/3801 |
| WO | WO 2007019511 A2 | | 2/2007 | | |

OTHER PUBLICATIONS

Written Opinion of the International Searching Authority PCT/ISA/237 for International Application No. PCT/EP2016/076021 dated Feb. 1, 2017.
Extended European Search Report #16151038.3 dated Aug. 2, 2016.
International Preliminary Report on Patentability for PCT/EP2016/076021 dated Jan. 12, 2018.

* cited by examiner

FIG 2
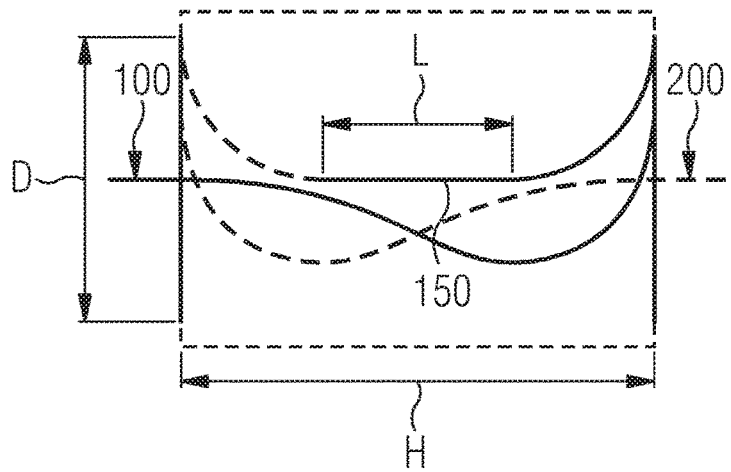
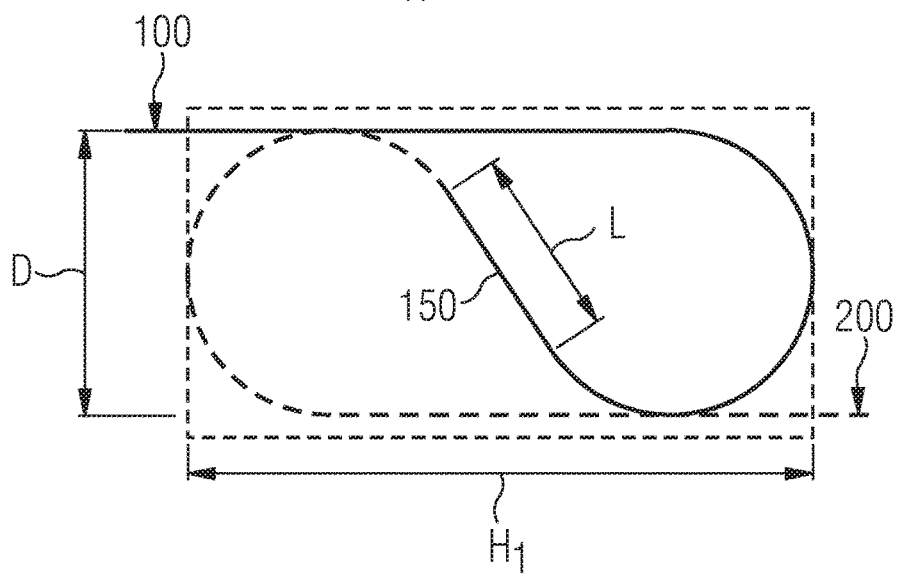
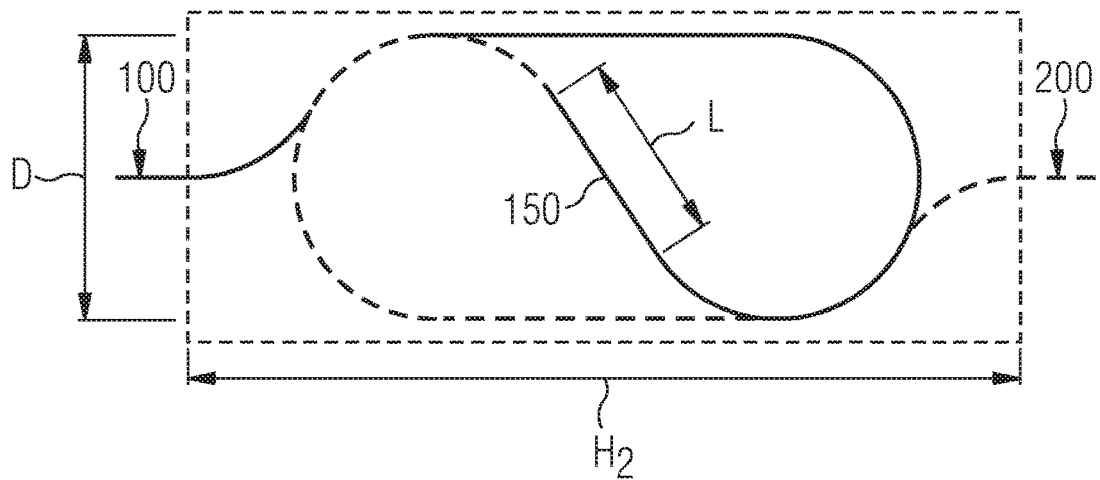

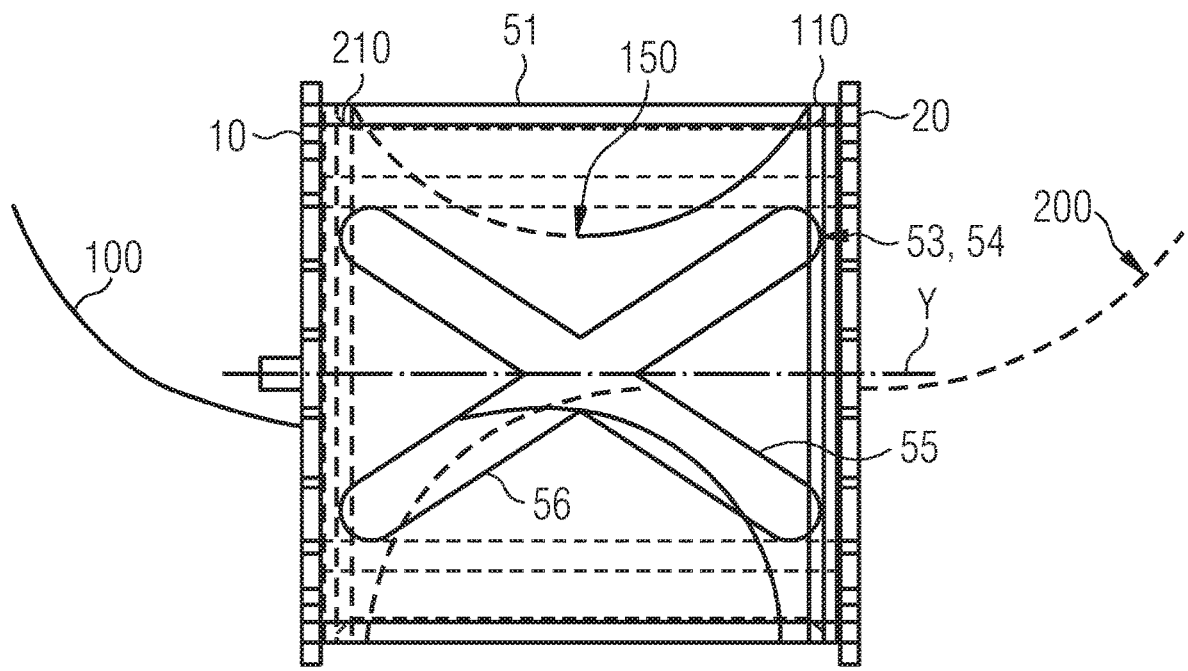

CABLE MANAGEMENT DEVICE AND METHOD

PRIORITY STATEMENT

This application is the national phase under 35 U.S.C. § 371 of PCT International Application No. PCT/EP2016/076021 which has an International filing date of Oct. 28, 2016, which designated the United States of America and which claims priority to European patent application number EP 16151038.3 filed Jan. 13, 2016, the entire contents of each of which are hereby incorporated herein by reference.

FIELD

At least one embodiment of the invention generally relates to a device and/or a method for managing optical fibres.

BACKGROUND

In a technical field, it is known to connect optical fibres within a limited space.

Fibre management devices are used wherein fibre-carrying cables are joined end-to-end to other cables and housed therein. Junctions are normally referred to as "splices" and may be performed, according to conventional known-in-the-art method by heating and fusing together the cable ends to be joined together. So-called "sleeves" or "protectors" are used around the junction to keep optical fibres in contact and avoid signal losses. Other type of junctions, for example mechanical connectors may be used.

In all cases, sleeves, protectors or connectors are mainly linear and have to be housed in the device without being deformed, in order not to compromise the splice and the signal transmission. Excess fibres, always needed to complete the termination process, need also to be stored within the management device.

SUMMARY

The inventors have discovered that one possible solution for the housing of the above described optical fibres is to configure two joined-together fibres or fibre cables as a "figure-eight" lying on plane, where a central straight portion is reserved for the splice sleeve. This avoids also that torque and the concomitant twisting resulting from it, as in the figure-eight configuration a turn of the fibre in one sense followed immediately by a turn in the other sense, cancels out the torque.

In a further search for space saving, the inventors further note that it could be theoretically possible to reduce the dimensions of the figure-eight configuration, in particular the radius of the turns, to have a smaller fibre management device. However, a lower value for the radius of a fibre cable bent exists, below which either the fibre may be damaged by a too sharp bent or there is unacceptable loss of the optical signal propagating within the fibre. As a result, to reduce the size of the fibre management device below the axial size imposed by the minimum acceptable radius of the fibre cable, it is necessary to abandon the plane figure-eight configuration, as, for example proposed in U.S. Pat. No. 8,731,362, where the fibre cable is bent according to a three-dimensional figure-eight pattern. The main inconvenience of the latter solution is that a dedicated winding track having a complex three-dimensional shape has to be provided to achieve the proposed winding pattern.

Thus, the inventors note is therefore still desirable to have an improved device and method to manage the connections between optical fibres in an efficient way, in order to minimize the dimensions of the cable management device, in particular along an axial direction.

At least one embodiment of the present invention provides a cable management device and method improving upon or even solving at least one of the above described inconveniences experimented in known cable winding device and pattern.

At least one embodiment of the present invention provides a cable management device and method which allows the cable to hold the winding shape without additional fixing devices, such as adhesives.

At least one embodiment of the present invention provides a cable management device and method which allows more than one cable to be housed in the same management device without having to increase the dimensions of the device.

Embodiments are directed to cable management device and a cable management method. The dependent claims describe advantageous developments and modifications of the invention.

According to a first embodiment of the present invention, a device for managing one or more flexible cables having a rigid portion is provided. The device comprises:
 a first axial end and a second axial end distanced from one another along an axis of the device,
 at least a first winding surface at the first axial end and at least a second winding surface at the second axial for receiving at least first coil and a second coil of the flexible cable, respectively, the first and second winding surfaces being transversal with respect to the axis of the device, and
 a constraint for supporting the rigid portion of the flexible cable between the first and the second axial end.

According to a second embodiment of the present invention, a method for managing one or more flexible cables having a rigid portion is provided. The method may be used for managing one or more flexible cables having a rigid portion on a cable management device comprising a first axial end and a second axial end distanced from one another along an axis of the device and at least a first winding surface at the first axial end and at least a second winding surface at the second axial, the first winding surface and the second winding surface being transversal with respect to the axis of the device. The method of a second embodiment comprises:
 winding a first coil and a second coil of the flexible cable at the first winding surface and at the second winding surface, respectively, and
 constraining the rigid portion of the flexible cable between the first and the second axial end.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment, but to which the invention is not limited.

FIG. 2 shows three lateral views of the schematic cable layouts shown in FIG. 1;

FIG. 9 shows a lateral view of the cable management device of FIG. 8.

DETAILED DESCRIPTION OF THE EXAMPLE EMBODIMENTS

Figure 1:
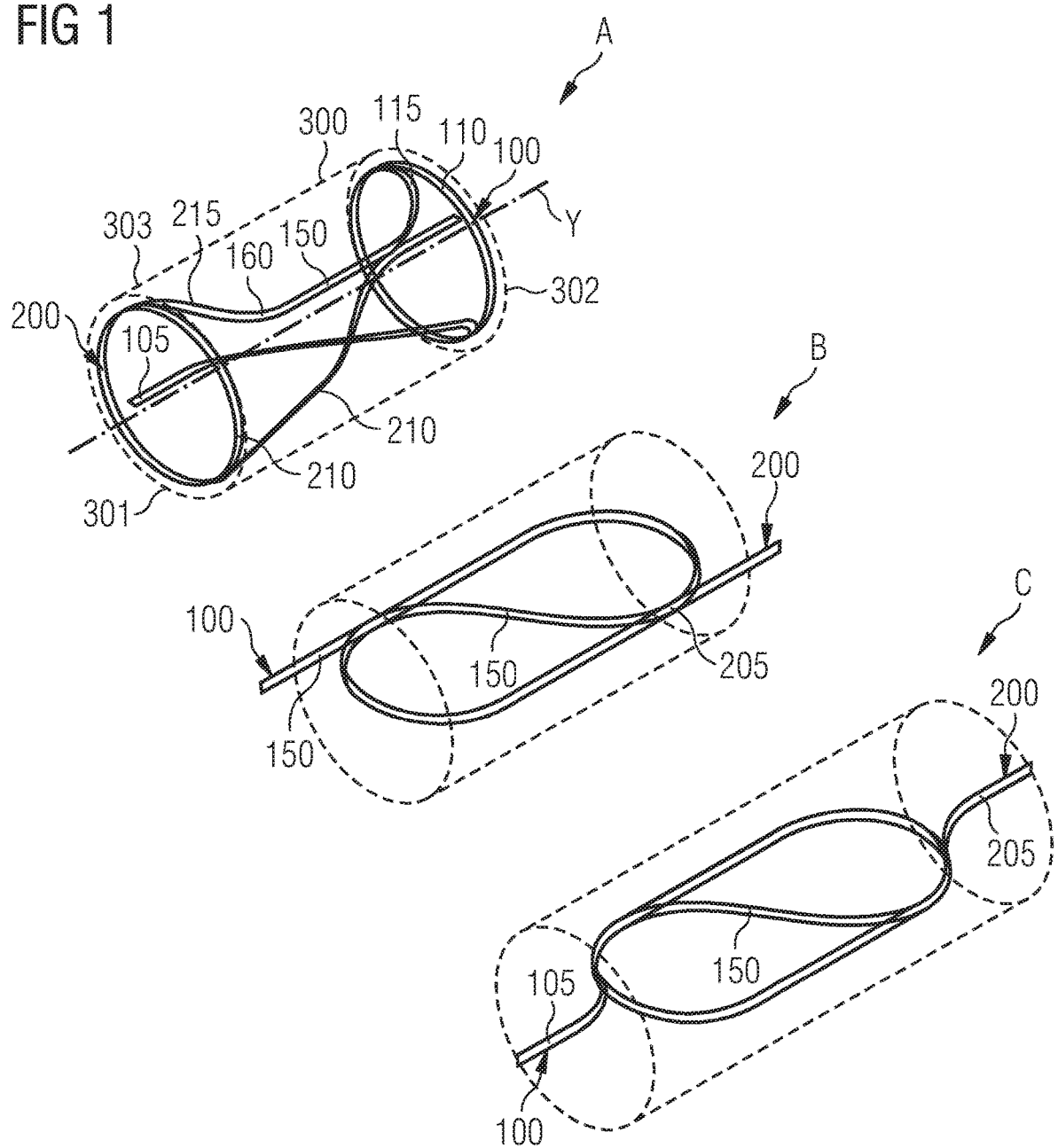
FIG. 1 shows an axonometric view of a schematic layout of a cable managed according to an embodiment of the present invention, compared to two axonometric schematic layouts of two cables managed according to the prior art.

The illustrations in the drawings are schematic. It is noted that in different figures, similar or identical elements are provided with the same reference signs.

According to a first embodiment of the present invention, a device for managing one or more flexible cables having a rigid portion is provided. The device comprises:
- a first axial end and a second axial end distanced from one another along an axis of the device,
- at least a first winding surface at the first axial end and at least a second winding surface at the second axial for receiving at least first coil and a second coil of the flexible cable, respectively, the first and second winding surfaces being transversal with respect to the axis of the device, and
- a constraint for supporting the rigid portion of the flexible cable between the first and the second axial end.

According to a second embodiment of the present invention, a method for managing one or more flexible cables having a rigid portion is provided. The method may be used for managing one or more flexible cables having a rigid portion on a cable management device comprising a first axial end and a second axial end distanced from one another along an axis of the device and at least a first winding surface at the first axial end and at least a second winding surface at the second axial, the first winding surface and the second winding surface being transversal with respect to the axis of the device. The method of a second embodiment comprises:
- winding a first coil and a second coil of the flexible cable at the first winding surface and at the second winding surface, respectively, and
- constraining the rigid portion of the flexible cable between the first and the second axial end.

Advantageously, the winding of the first coil and of the second coil on two respective axially distanced first winding surface and second winding surface allows, with respect to the known solutions described above, saving space in an axial direction, transversal to the coils.

The rigid portion of the flexible cable is constrained to the device in order to be easily accessible. The rigid portion may be the connection between two cables, in particular a fusion splice between two fibre optic cables, in particular between two optical fibers. According to possible embodiments of the present invention the rigid portion of the flexible cable is supported on a cylindrical surface of the device.

Advantageously, thanks to the cylindrical symmetry which characterizes the cable management device and method, allows a plurality of different cables to be managed. The cables may be regularly distributed around an axis of the device.

According to possible embodiments of the present invention, the method further comprises, for a pair of flexible cables joined together at the rigid portion:
- positioning a first portion of one cable between the first axial end and the second winding surface, where the first coil is wound
- positioning a first portion of the other cable between the second axial end and the first winding surface.

Advantageously, the crossed pattern between the first portions of the cables and the two opposite winding surfaces, where the coils are wound contributes to the axial space saving.

It has to be noted that embodiments of the invention have been described with reference to different subject matters. In particular, some embodiments have been described with reference to apparatus type claims (claims about a rotor and a steam turbine) whereas other embodiments have been described with reference to method (claims about a method for monitoring fatigue) type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this document.

FIGS. 1 and 2 show a cable 100, 200 including an intermediate rigid portion 150 wound according to a cable management method A of the present invention. For comparison with the prior art, the same cable 100, 200, wound according to two known cable management methods B and C, is shown in the same FIGS. 1 and 2.

The cable 100, 200 comprises two distinct cables 100, 200 joined together at the rigid portion 150. In general and according to other embodiments of the present invention, cable management method A may be applied to wound in a reduced space any cable including a rigid portion.

The cables 100, 200 are optic fibre flat cables, each including a plurality of single strand signal carriers (for example, twelve single strand signal carriers, in particular optical fibers). The flat cables 100, 200 are joined together at the intermediate rigid portion 150 via a cable splicing technique, for example fusion splicing, which is conventional and known in the art and therefore not described in further detail. The intermediate rigid portion 150 comprises a splice protector or a splice sleeve (not shown in FIGS. 1 and 2).

According to other embodiments of the present invention, the cables 100, 200 may be of a different type, for example they may be single strand cables. The cables 100, 200 may be joined together at the intermediate rigid portion 150 by way of a joining technique different from fusion splicing, for example via a mechanical connector.

According to the cable management method of an embodiment of the present invention, the cables 100, 200 are wrapped to occupy a cylindrical space envelope 300, having:
- a first circular base 301,
- an opposite second circular base 302, distanced from the first base 301 along an axis Y of space envelope 300, and
- a lateral surface 303, connecting the bases 301, 302.

The first and second circular bases 301, 302 have the same diameter D. The lateral surface 303 has a height H, which is also the distance between the first and second circular bases 301, 302.

When wrapped in the space envelope, the first cable 100 comprises:
a first free-end portion 105, extending from the centre of the first base 301 to the border of the second base 302,
a second portion 110, wrapped as a circular coil at the second base 302, and
a third portion 115, extending from the coil 110 to the intermediate rigid portion 150.

When wrapped in the space envelope, the second cable 200 comprises:
a first free-end portion 205, extending from the centre of the second base 302 to the border of the first base 301,
a second portion 210, wrapped as a circular coil at the first base 301, and
a third portion 215, extending from the coil 210 to the intermediate rigid portion 150.

The third portions 115 and 215 together with the intermediate rigid portion 150 constitute a central bend 160 of the cable 100, 200 extending from one to the other of the coils 110, 210.

The value of diameter D assures the required compromise between saving of space, avoiding that the fibre may be damaged by a too sharp bent and preventing unacceptable loss of the optical signal propagating from one to the other of the cables 100, 200.

At the lateral surface 303 of the space envelope 300, the intermediate rigid portion 150 is supported at a position which is equidistant from the bases 301, 302. The intermediate rigid portion 150 is oriented parallel to the axis Y of the space envelope 300. The intermediate rigid portion 150 has a length L, which provides the cables 100, 200 with a satisfactory mechanical and functional connection; in particular as far as signal transmission is concerned.

According to a possible embodiment of the present invention the values of D and L are 60 mm and 40 mm, respectively. With the cable management method A of the present invention, as a result, the wrapped cable 100, 200 occupies a cylindrical space envelope 300 having a height H of about 99 mm.

According to a known cable management method B, the cables 100, 200 are wrapped in a "figure-eight" configuration lying on plane, wherein the free-end portion 105, 205 of the cables 100, 200 pass, respectively, through the first and second circular bases 301, 302 at a respective border thereof. The cable 100, 200, wrapped according to the cable management method B, occupies a cylindrical space envelope 300 having a height H1 of about 132 mm.

According to a known cable management method C, the cables 100, 200 are wrapped in a "figure-eight" configuration lying on plane, wherein the free-end portion 105, 205 of the cables 100, 200 pass, respectively, through the first and second circular bases 301, 302 at a respective centre thereof. The cable 100, 200, wrapped according to the cable management method C, occupies a cylindrical space envelope 300 having a height H2 of about 176 mm.

The comparison between the values of H, H1, H2 shows clearly the effectiveness of the present invention in reducing the axial span of the space envelope of the wrapped cable 100, 200. The same result is obviously obtained also changing the values of D and L.

FIGS. 3 to 9 show three different embodiments 1, 2, 3 of a device for managing the flexible cable 100, 200 having the rigid portion 150. The devices 1, 2 and 3 can be used as wrapping guides to obtain the cylindrical wrapping above described, with reference to FIGS. 1 and 2.

The device 1 (FIGS. 3 to 5) has a cylindrical shape and comprises a first axial end 10 and a second axial end 20 distanced from one another along an axis Y of the device 1 and connected by a cylindrical external shroud 15. The device 1 can be used for managing one single flexible cable 100, 200 with a rigid portion 150. The flexible cable 100, 200 comprises a first fibre optic cable 100 and a second fibre optic cable 200 joined together by a fusion splice. Each of the cables 100, 200 includes twelve single strand signal carriers, in particular optical fibers, it may include more or fewer signal carriers in other embodiments. The rigid portion 150 comprises a splice sleeve 151 for protecting the fusion splice connecting the cables 100, 200. A fusion splice can be provided for each signal carrier, and accordingly, plural rigid portions, each comprising a fusion splice and a splice sleeve 151 can be present in embodiments.

According to other embodiments (not shown), the rigid portion 150 may comprise a mechanical connector.

The axial ends 10, 20 respectively comprise:
first conic portions 24, 25, axially protruding from respective opposite axial ends of the external shroud 15,
second cylindrical portions 26, 27, respectively adjacent to the first conic portions 24, 25 and connected in a sealed manner to the external shroud 15, and
third cylindrical portions 28, 29, respectively adjacent to the second cylindrical portions 26, 27. The third cylindrical portions 28, 29 have smaller diameters than the respectively adjacent second cylindrical portions 26, 27.

Each first conic portion 24, 25 comprises a respective input/output hole 12, 22, coaxial with respect to the axis Y of the device 1. The input/output holes 12, 22 house input/output signal connections (not shown) between the cables 100, 200 and the external of the device 1.

Each second cylindrical portion 26, 27 comprises a plurality of threaded holes 31 to be couple to a respective plurality of screws 32 (three holes 31 and three screws 32 for each second cylindrical portion 26, 27 in the embodiments of FIGS. 3 to 7) for fixing the external shroud 15 to the axial ends 10, 20. Each second cylindrical portion 26, 27 further comprises two O-ring seals 33 for isolating the device 1 from the external environment. The sealing also holds internal pressure, thus making the device 1 also suitable for subsea applications.

The third cylindrical portions 28, 29 comprise a first cylindrical winding surface 11 and a second cylindrical winding surface 21, respectively, for receiving the second coil 210 and the first coil 110 of the flexible cables 200, 100, respectively.

Figure 3:
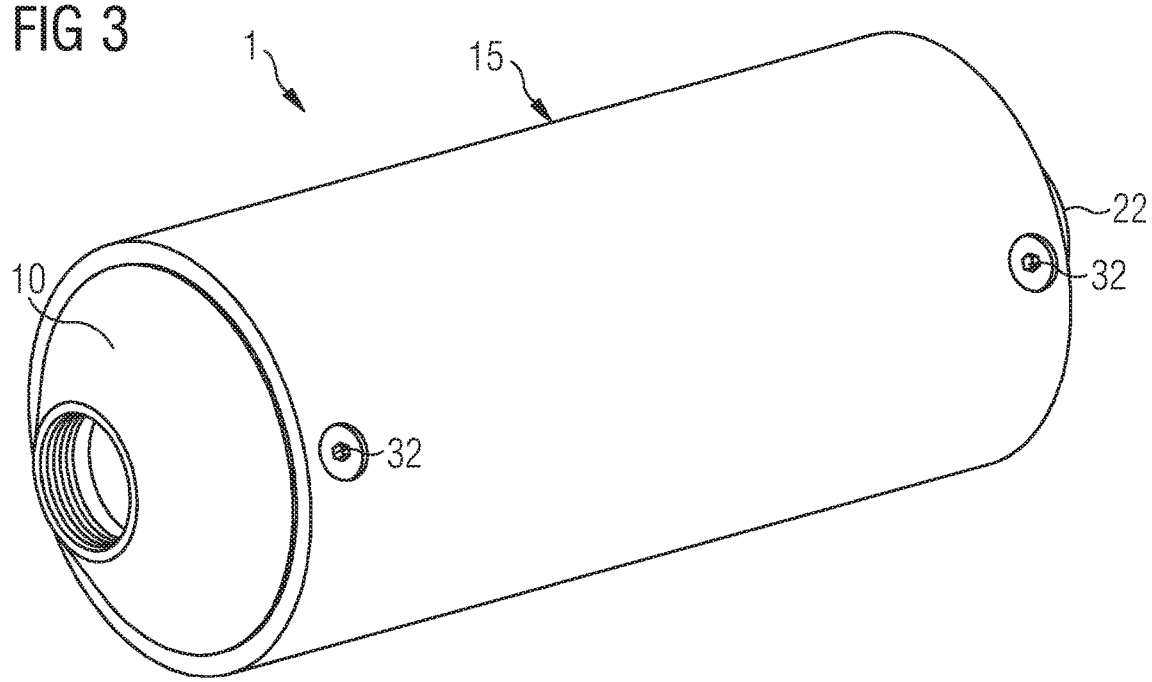
FIG. 3 shows an axonometric view of a first embodiment of a cable management device, according to the present invention.
Figure 4:
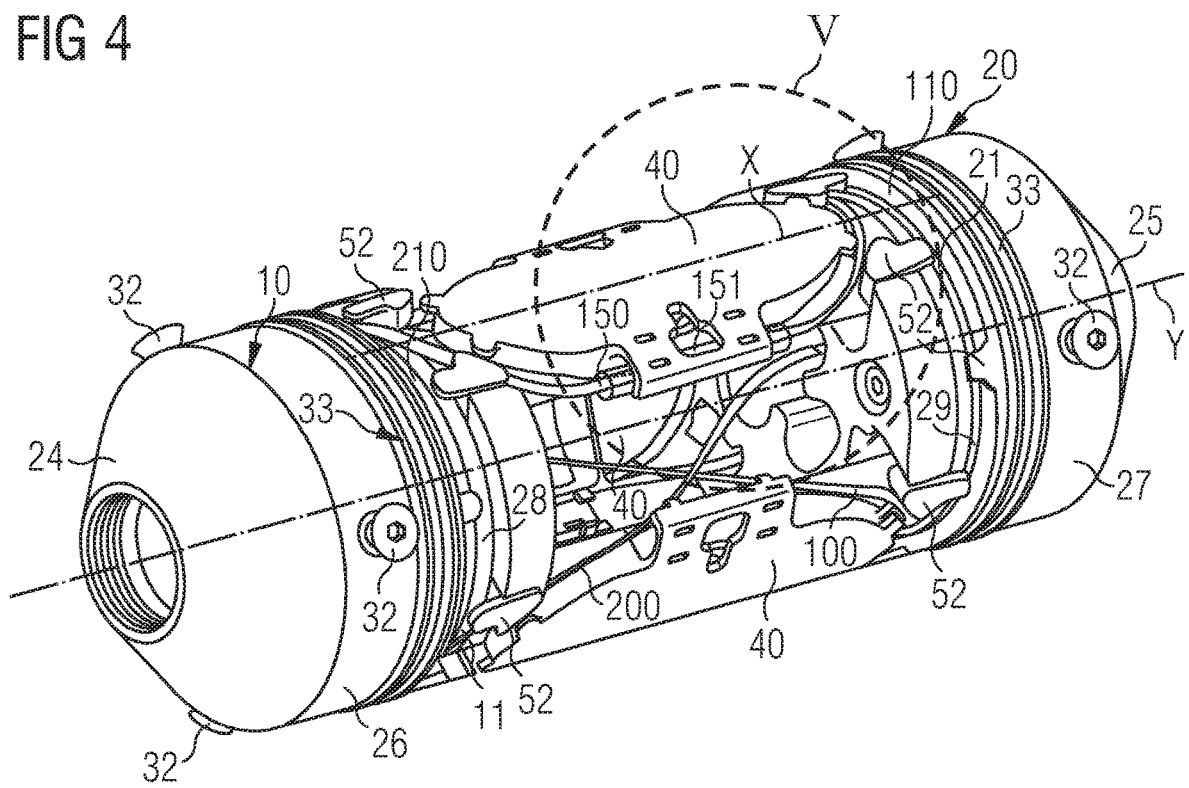
FIG. 4 shows a partial axonometric view of the cable management device of FIG. 3.
Figure 5:
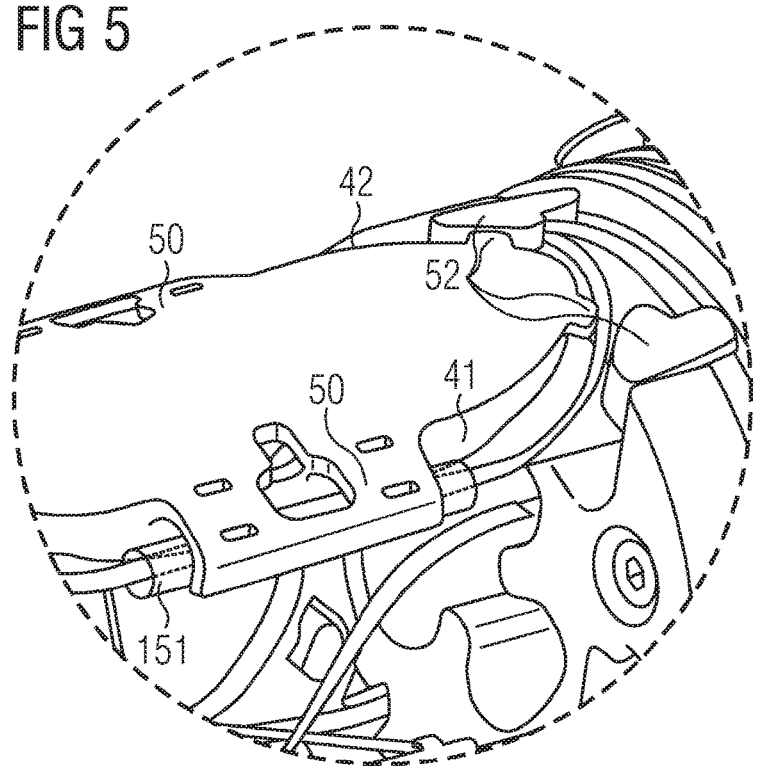
FIG. 5 shows a magnified view of the detail V of FIG. 4.
Figure 6:
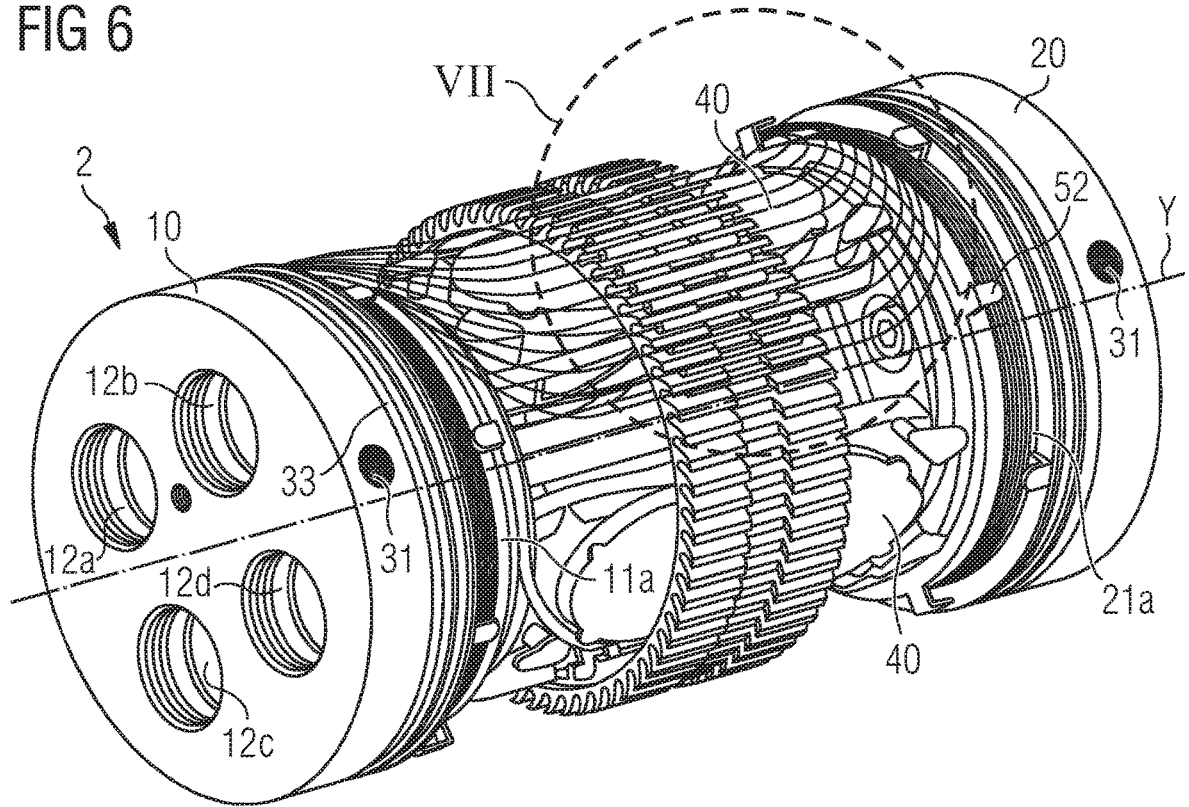
FIG. 6 shows a partial axonometric view of a second embodiment of a cable management device, according to the present invention.
Figure 7:
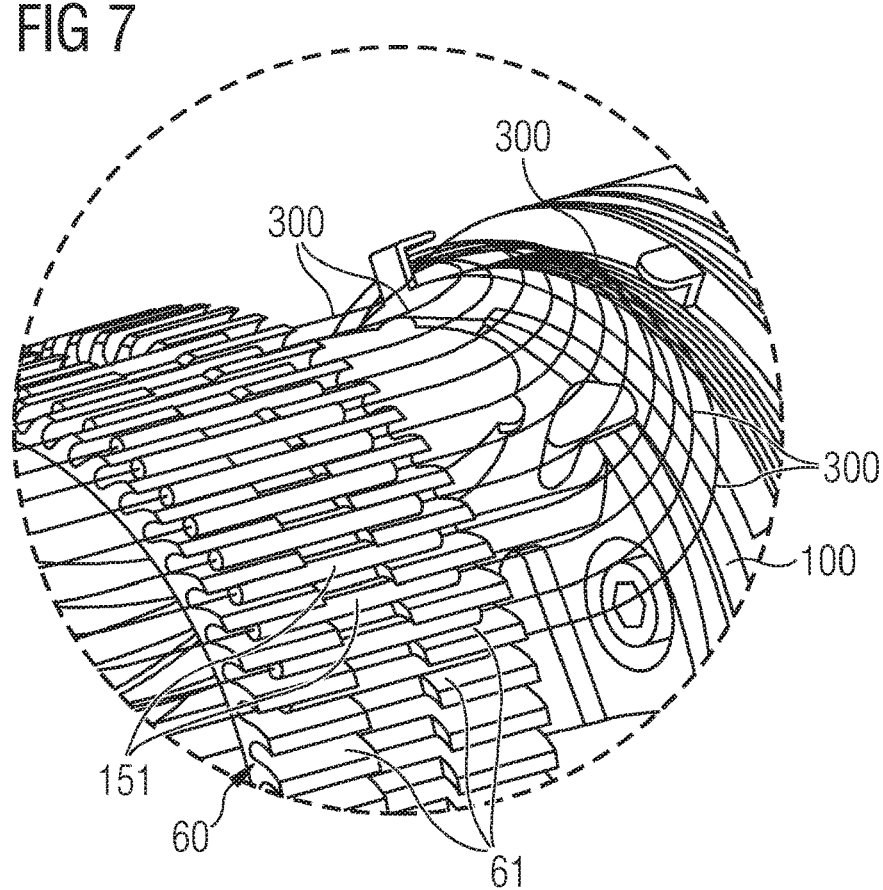
FIG. 7 shows a magnified view of the detail VII of FIG. 6.
Figure 8:
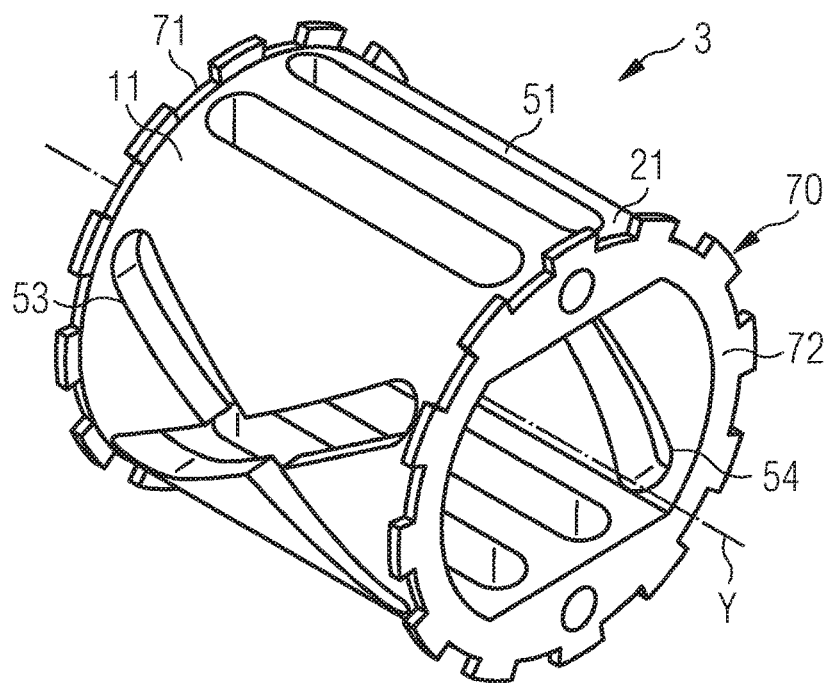
FIG. 8 shows a partial axonometric view of a third embodiment of a cable management device, according to the present invention.

The device 1 further comprises a plurality of central clipping units 40 regularly distributed around the axis Y of the device 1 (in the embodiment of FIGS. 3 to 5, three clipping units 40 placed at 120 degree increment around the axis Y). The clipping units 40 are positioned in a peripheral region of the device 1, immediately below the shroud 15, and extend axially from one to the other of the third cylindrical portions 28, 29. Each clipping unit 40 is symmetric with respect to a longitudinal axis X, parallel to the axis Y of the device 1, and comprises two curved lateral borders 41, 42, symmetric to each other and extending from one to the other of the third cylindrical portions 28, 29. Each of the curved lateral borders 41, 42 comprises a central clip 50 for receiving and holding the splice sleeve 151. In the embodiment of FIGS. 3 to 5, six central clips 50 are present, two for each clipping unit 40.

When the cable 100, 200 is assembled to the device 1, the central bend 160 is subject to dispose naturally along one or the other of the curved lateral borders 41, 42, depending on the direction of the windings (clockwise or counter clockwise) in the coils 110, 210. The central bend 160 is blocked with respect to one of the clipping unit 40, via the coupling between the splice sleeve 151 and the central clip 50 of the curved lateral border 41, 42 along which the central bend 160 naturally disposes. The clipping unit 40 which is used for the clipping of the central bend 160, among the plurality of clipping units 40 which are present, depend from the position of the central bend 160 around the axis of the device 1 and from its length.

In any case, the embodiment of FIGS. 3 to 5 can allow one cable 100, 200 to be managed.

Along the first cylindrical winding surface 11, the second cylindrical winding surface 21 and the curved lateral borders 41, 42 holding protrusions (or clips) 52 are provided for holding the cable 100, 200 in position, even with some slack, in particular during assembly of the cable 100, 200 in the device 1.

The device 2 (FIGS. 6 and 7) is similar to the previously described device 1 but is designed with some differences, which are detailed in the following, in order to manage a plurality of flexible cables 100, 200 each with a rigid portion 150.

The first axial end 10 of the device 2 comprises a plurality of input/output holes (four input/output holes 12a, 12b, 12c, 12d) parallel to the axis Y of the device 2 and regularly distributed, at 90 degree increments, around it. The second axial end 20 of the device 2 similarly comprises four other holes (not visible in FIGS. 6 and 7) respectively coaxial with the holes 12a, 12b, 12c, 12d of the first axial end 10. The input/output holes 12a, 12b, 12c, 12d and holes on the second axial end 20 house input/output signal connections (not shown) between four flat fibre optic cables 100, 200 and the external of the device 2.

According to other possible embodiments of the present invention, a different number of input/output holes may be present at the first axial end 10 and, correspondently, at the second axial end 20.

Similarly to the device 1, the third cylindrical portions 28, 29 of the device 3 comprise a first cylindrical winding surface 11 and a second cylindrical winding surface 21, respectively, for receiving the respective second coils 210 and first coils 110 of all the four flexible flat cables 200, 100.

The third cylindrical portions 28, 29 of the device 3 further comprise a third cylindrical winding surface 11a and a fourth cylindrical winding surface 21a, respectively. The third cylindrical winding surface 11a is positioned between the first cylindrical winding surface 11 and the second cylindrical portion 26 of the first axial end 10. The fourth cylindrical winding surface 21a is positioned between the second cylindrical winding surface 21 and the second cylindrical portion 27 of the second axial end 20. The third cylindrical winding surface 11a and the fourth cylindrical winding surface 21a are designed for receiving and holding a plurality of coils of single strand signal carriers 300, wound in the device 2 according to the management method of the present invention. The single strand signal carriers 300 may derive from the splitting of the twelve signal carriers which constitute each of the four flat fibre optic cables 100, 200. The device 2 may house therefore a maximum of forty-eight single strand signal carriers, in particular individual optical fibers.

According to other embodiments of the present invention, different cable management devices may be designed for managing a different number of cables, either multi-stranded or single-stranded.

The device 2 further comprises a rack 60 having a plurality of clips 61 regularly distributed around the axis Y of the device 2 for receiving and holding the splice sleeve 151 of the single strand signal carriers 300. Device 2 of the FIGS. 6 and 7 comprises fifty-eight clips 61 placed at ca. 6.2 constant degree increment around the axis Y, i.e. a clip 61 for each of the of forty-eight single strand signal carriers plus ten spare clips 61 for allowing additional splice locations. The rack 60 is positioned in a peripheral region of the device 2, immediately below the shroud 15. The rack 60 is supported by four central clipping units 40 regularly distributed around the axis Y of the device 1, at 90 degree increment around the axis Y. Each of the four central clipping units 40 of the device 2 comprises two central clips 50 for each of the curved lateral borders 41, 42 for receiving and holding two respective splice sleeves 151 of a respective flat fibre optic cable 100, 200. The two central clips 50 allow each central clipping unit 40 to receive and hold one splice sleeve 151 of a fibre optic cable entering from the first axial end 10 and another splice sleeve 151 of a fibre optic cable entering from the second axial end 20. After the clipping at the respective central clip 50 the ribbon fibre optic cable 100, 200 is fanned out into the respective plurality single fibres.

The device 3 (FIGS. 8 and 9) comprises a cylindrical insert 70, to be used as a wrapping guide to wrap the flexible cable 100, 200. The insert 70 is hollow and comprises two open bases 71, 72, respectively at the first axial end 10 and at the second axial end 20. The two open bases 71, 72 correspond respectively to the first and second circular bases 301, 302 of the cylindrical space envelop 300. The insert 70 comprises also a cylindrical support surface 51 axially extended between the first axial end 10 and at the second axial end 20. The cylindrical support surface 51 comprises the first winding surface 11 and the second winding surface 21, respectively adjacent to two open bases 71, 72. The cylindrical support surface 51 supports the fusion sleeve 151 (not represented in FIGS. 8 and 9) of the flexible cable 100, 200 between the first and the second axial end 10, 20.

At two diametrically opposite positions, the cylindrical support surface 51 comprises two X-shaped slots 53, 54 for connecting the inside of the insert 70 to the cylindrical support surface 51. The first free-end portions 105 of the cable 100 can be positioned from the first open base 71 to the second winding surface 21 by passing through one of two X-shaped slots 53, 54. The first free-end portions 205 of the cable 200 can be positioned from the second base 72 to the first winding surface 11 through the same X-shaped slot 53, 54 used for the first free-end portions 105 of the cable 100. One or the other of the X-shaped slots 53, 54 is used depending on the direction of the windings (clockwise or counter clockwise) in the coils 110, 210. Each of two X-shaped slots 53, 54 comprises:

a first linear slot 55, having a first predefined inclination with respect to the axis Y, in order to allow a smooth passage of first free-end portion 105 without causing undesirable bends to the cable 100, and a second linear slot 56, having a second inclination, opposite to the inclination of the first linear slot 55 with respect to the axis Y, in order to allow a smooth passage of first free-end portion 205 without causing undesirable bends to the cable 200.

At two other diametrically opposite positions, at 90 degree angular distance from the two X-shaped slots 53, 54, the cylindrical support surface 51 further comprises two couples of linear slots 73, 74 and 75, 76, respectively. The linear slots 73, 74 and 75, 76 are parallel to axis Y and are optionally used for tying one or more tie-wraps (not represented) to the insert 70, in order to fix the cable 100, 200 thereto.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A device for managing at least one flexible cable including a rigid portion, the device comprising:
 a first axial end and a second axial end, the first axial end being distanced from the second axial end along an axis of the device;
 at least a first winding surface, at the first axial end, and at least a second winding surface, at the second axial end, to receive at least a first coil and a second coil of the flexible cable, the at least first winding surface and second winding surface being transversal with respect to the axis of the device; and
 a constraint to support the rigid portion of the flexible cable between the first axial end and the second axial end,
 wherein a first part of the flexible cable enters the device at the first axial end and is wound onto the second winding surface at the second axial end to form the first coil, and wherein a second part of the flexible cable enters the device at the second axial end and is wound onto the first winding surface at the first axial end to form the second coil.

2. The device of claim 1, wherein the constraint is a clip to hold the rigid portion of the flexible cable.

3. The device of claim 2, wherein the clip is oriented along the axis of the device.

4. The device of claim 3, wherein the clip is equidistantly positioned between and the first axial end and the second axial end.

5. The device of claim 2, wherein the clip is equidistantly positioned between and the first axial end and the second axial end.

6. The device of claim 1, wherein the constraint is a support surface axially extended between the first axial end and the second axial end.

7. The device of claim 1, wherein the first winding surface and the second winding surface are cylindrically shaped around the axis.

8. The device of claim 7, further comprising, on the respective first axial end and on the second axial end, at least a first input/output hole and a second input/output hole, respectively.

9. The device of claim 1, further comprising, on the respective first axial end and on the second axial end, at least a first input/output hole and a second input/output hole, respectively.

10. The device of claim 1, wherein the flexible cable comprises one or more optical fibers and wherein the rigid portion of the flexible cable includes a splice between a first part of the flexible cable and a second part of the flexible cable.

11. The device of claim 10, wherein the rigid portion of the flexible cable includes the splice between a first part of the optical fiber and a second part of the optical fiber.

12. The device of claim 10, wherein optical fibers of the flexible cable that enters the device at the first axial end enter the splice from a second axial end side of the device and optical fibers of the flexible cable that enters the device at the second axial end enters the splice at a first axial end side of the device.

13. The device of claim 1, wherein the flexible cable includes plural optical fibers and plural rigid portions, each of the plural rigid portions including a splice of a first part of an optical fiber and a second part of an optical fiber, wherein the constraint includes a plurality of supporting portions distributed circumferentially around the axis, the plurality of supporting portions being configured to support the plural rigid portions of the flexible cable.

14. The device of claim 13, wherein the plurality of supporting portions are clips, distributed circumferentially around the axis.

15. The device of claim 1, wherein the first winding surface and the second winding surface are spaced apart from one another.

16. A method for managing at least one flexible cable including a rigid portion on a cable management device, the cable management device including a first axial end and a second axial end, the first axial end being distanced from the second axial end along an axis of the cable management device, and at least a first winding surface at the first axial end and at least a second winding surface at the second axial end, the first winding surface and the second winding surface being transversal with respect to the axis of the cable management device, the method comprising:
 winding a respective one of a first coil and a second coil of at least one the flexible cable at a respective one of the second winding surface and at the first winding surface; and
 constraining the rigid portion of the at least one flexible cable between the first and the second axial end, wherein a first part of the flexible cable enters the device at the first axial end and is wound onto the second winding surface at the second axial end to form the first coil, and wherein a second part of the flexible cable enters the device at the second axial end and is wound onto the first winding surface at the first axial end to form the second coil.

17. The method of claim 16, further comprising:
 joining together two parts or a pair of flexible cables to constitute the rigid portion.

18. The method of claim 17, further comprising:
 positioning a first portion of one cable of the pair of flexible cables between the first axial end and the second winding surface; and
 positioning a first portion of another cable of the pair of flexible cables between the second axial end and the first winding surface.

19. The method of claim 18, wherein the first portion of the one cable of the pair of flexible cables passes through a first hole provided on the first axial end and wherein the first portion of the another cable of the pair of flexible cables passes through a second hole provided on the second axial end.

20. The method of claim 18, wherein the pair of flexible cables are optic fibre cables, the rigid portion being a splice including a splice sleeve.

21. The method of claim 18, wherein the method is repeated for each of a plurality of pairs of flexible cables, the plurality of pairs of flexible cables being regularly distributed.

22. The method of claim 17, wherein the pair of flexible cables are optic fibre cables, the rigid portion being a splice including a splice sleeve.

23. The method of claim 17, wherein the pair of flexible cables are optic fibre cables, the rigid portion being a splice including a splice sleeve.

24. The method of claim 17, wherein the method is repeated for each of a plurality of pairs of flexible cables, the plurality of pairs of flexible cables being regularly distributed.

25. The method of claim 16, wherein the method is repeated for each of a plurality of pairs of flexible cables, the plurality of pairs of flexible cables being regularly distributed around the axis of the cable management device.

* * * * *